(12) United States Patent
Dion

(10) Patent No.: US 6,219,969 B1
(45) Date of Patent: Apr. 24, 2001

(54) PLANT CONTAINERIZING AND WATERING DEVICE

(76) Inventor: André Dion, 261 Turgeon, app. 406, Québec (CA), J7G 4V8

( * ) Notice: Subject to any disclaimer, the term of this patent is extended or adjusted under 35 U.S.C. 154(b) by 0 days.

(21) Appl. No.: 09/344,117

(22) Filed: Jun. 24, 1999

Related U.S. Application Data

(60) Provisional application No. 60/090,414, filed on Jun. 23, 1998.

(51) Int. Cl.$^7$ ............................ A01G 27/00; A01G 27/02
(52) U.S. Cl. ............................................................ 47/79
(58) Field of Search ........................... 47/79, 80, 66.1, 47/65.5, 48.5

(56) References Cited

U.S. PATENT DOCUMENTS

| | | | |
|---|---|---|---|
| 918,563 | * | 4/1909 | Lewis ........................................ 47/80 |
| 3,137,096 | * | 6/1964 | Hopkins .................................... 47/79 |
| 4,014,506 | * | 3/1977 | Hanson .............................. 248/311.1 |
| 4,096,663 | * | 6/1978 | Silver ....................................... 47/80 |
| 4,160,342 | * | 7/1979 | Dryer ....................................... 47/80 |
| 4,171,593 | * | 10/1979 | Bigglestone ............................ 47/79 |
| 4,356,665 | * | 11/1982 | de Oliveira .............................. 47/80 |
| 4,993,186 | * | 2/1991 | Immonen ................................. 47/79 |
| 5,921,025 | * | 7/1999 | Smith ....................................... 47/79 |
| 6,145,250 | * | 11/2000 | Mai ........................................ 47/79 |

FOREIGN PATENT DOCUMENTS

| | | | |
|---|---|---|---|
| 31 31 282 A1 | * | 2/1983 | (DE) ........................................ 47/79 |
| 0 195 542 | * | 9/1986 | (EP) ........................................ 47/79 |
| 0 209 498 | * | 1/1987 | (EP) ........................................ 47/79 |
| 2 067 474 | * | 8/1971 | (FR) ........................................ 47/79 |
| 2 139 465 | * | 11/1984 | (GB) ........................................ 47/79 |

* cited by examiner

*Primary Examiner*—Peter M. Poon
*Assistant Examiner*—Jeffrey L. Gellner

(57) ABSTRACT

A plant containerizing and watering device for containing a plant growing medium and facilitating irrigation of the growing medium by a liquid. The device includes a first container and a second container. The second has at least one venting aperture extending through its base wall. The second container is configured and sized so as to be at least partially insertable within the first container with their respective base maintained in a predetermined spaced relationship relative to each other. A trough extends outwardly from the second container. The trough has at least one trough aperture positioned between the first and second container base walls. A removable reservoir is inserted within the second container. The device also includes a valve mechanism, in fluid communication with the removable reservoir for selectively and automatically transferring a transfer volume of liquid from the removable reservoir to a relatively constant volume of liquid contained between the base walls of the first and second containers so that the surface of the relatively constant volume of liquid is maintained at a relatively constant base level allowing fluid communication with the trough aperture. When a fraction of the relatively constant volume of liquid is soaked up through the trough aperture by a capillary action of the growing medium contained in the second container the valve mechanism transfers a corresponding volume of the liquid from the removable reservoir to the volume between the base walls.

18 Claims, 2 Drawing Sheets

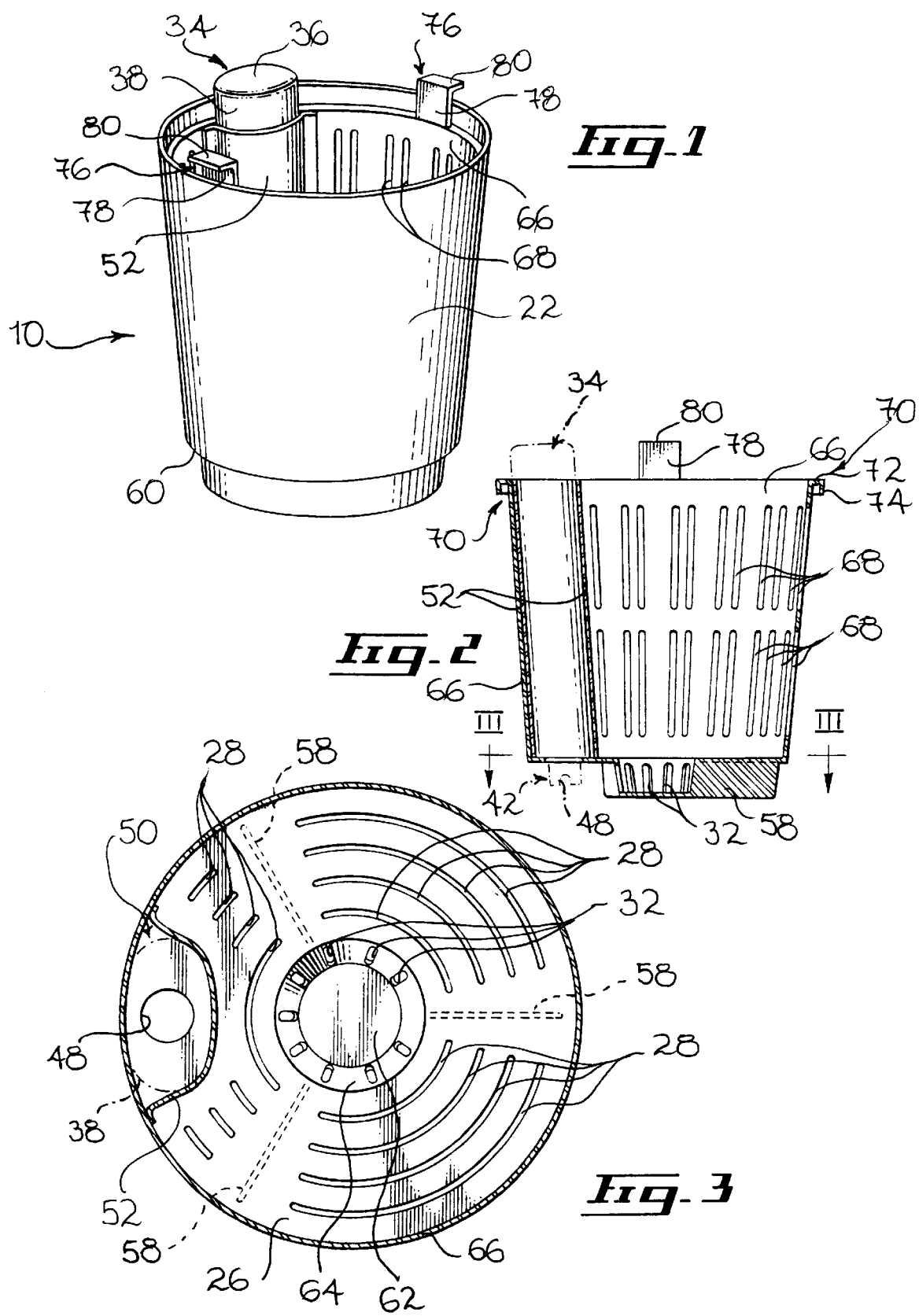

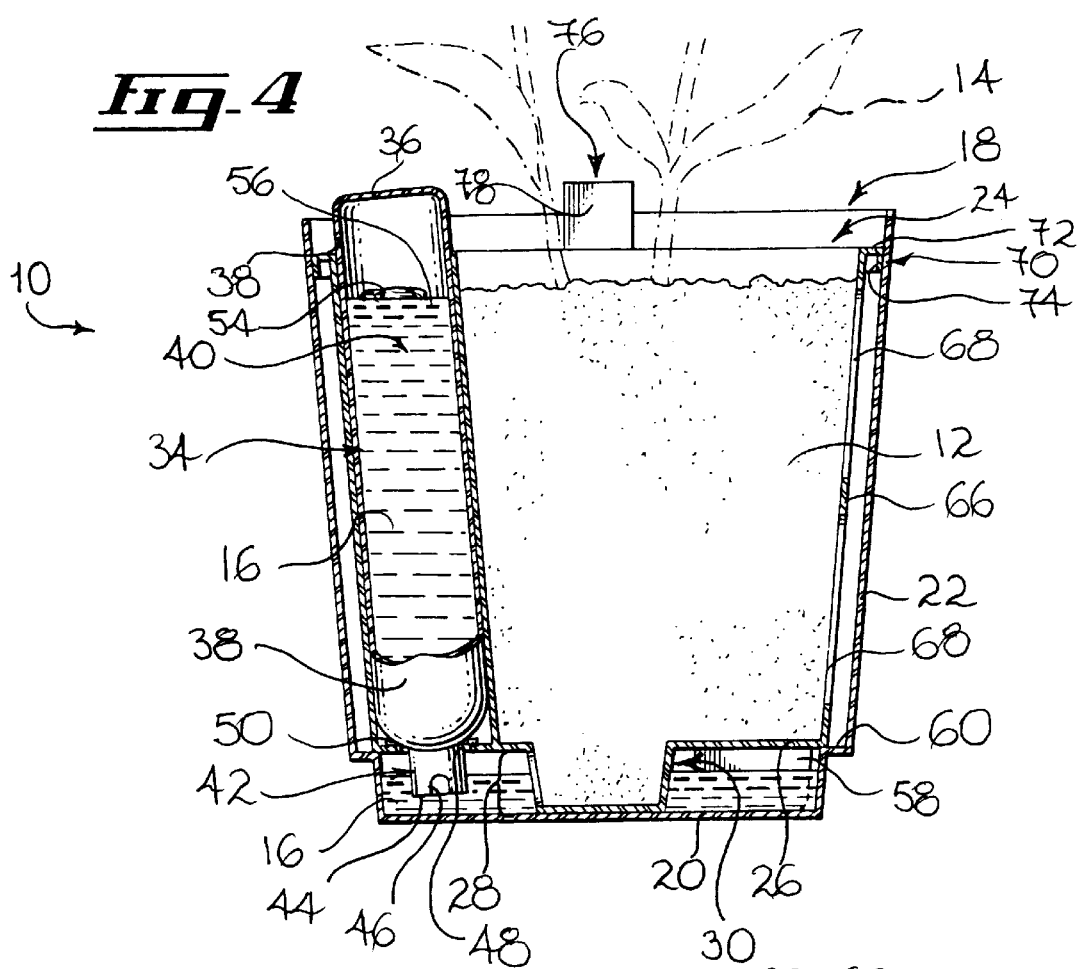

PLANT CONTAINERIZING AND WATERING DEVICE

The following application claims benefit of U.S. Provisional Application No. 60/090,414 filed Jun. 23, 1998.

FIELD OF THE INVENTION

The present invention relates to the field of horticultural devices and is particularly concerned with a plant containerizing and watering device.

BACKGROUND OF THE INVENTION

Plants of various sorts are being used increasingly in various situations and environments such as dwellings and work environments to beautify the appearance of the area. However, the proper irrigation of plants and especially indoor potted plants, has long been a problem, particularly in situations wherein the plants must remain unattended for prolonged periods of time.

Horticultural experts agree that a preferred method of water and feeding potted plants is by soil capillary action. The well-known capillary action depends on the phenomenon caused by the adhesion of water molecules to a given surface due to surface tension. In the case of plant watering, soil will draw water by capillary action.

Several advantages are provided by such a method. First, watering by use of a sub-irrigated reservoir, particularly by capillary action allows the plant owner to water the plant less frequently. Second, elimination of overhead watering prevents pesticides and other useful products from being washed off the leaves increasing their effective half-life. Third, by using capillary action soil nutrients remain in the soil. Fourth, due to inverted leaching certain compounds such as salt which are harmful to the plant when concentrated near roots will steadily move out of the primary root zone as fresh water rises out of the reservoir. Fifth, overall, plant watering by capillary action creates a beneficial environment for the plant by increasing the humidity level around the plant's foliage.

Some prior art devices have been specifically designed for plant watering by capillary action. However, many of such prior art system are unduly complicated and thus cannot be produced at a reasonable cost.

Another critical problem with prior sub-irrigation plant watering system is the inability to supply sufficient amounts of oxygen to the soil and plant root structure. Indeed, some of the devices do not allow oxygen around the saturated soil and consequently roots deteriorate.

Accordingly, there exists a need for an improved plant watering system. Advantages of the present invention include the fact that the proposed system provides an inexpensive and simple plant growing system which provides a proper amount of water and oxygen to the plant so as to eliminate the harmful effect caused by over or under watering.

The proposed system provides for a built-in reservoir allowing controlled dispensing of watering liquids. The reservoir although being capable of containing a relatively large volume of water so as to provide for superior autonomy is strategically positioned so as not to deter the crucial esthetical aspect of the overall watering system. In fact, the internal components of the watering system even though the latter provides for relative long autonomy is strategically positioned so as to be concealed at least partially from the viewer's eyes.

One of the main advantages of the present invention resides in that in at least one embodiment the device is specifically adapted to allow for self-watering of the growing mediun contained therein and contact of the latter with surrounding air. In one specific embodiment, the device is configured so as to allow for contact with surrounding air not only about its base wall but also its peripheral walls so as to increase the overall contact surface with surrounding air.

Another advantage resides in that the proposed device allows an intended user to grow the plant in a first environment such as a greenhouse in an inner container part of the device and then transfer the plant within the inner container into an outer container more suitable for transportation and retail. The growing medium remaining inside the inner container reduces the risks of damage to the plant associated with conventional transplanting methods. The advantages associated with the self-watering and peripheral air contact are maintained whether the second container is inserted or not within the first container.

Also, the proposed device has a built-in means for facilitating insertion and withdrawal of the second container to and from the first container. Still further, the proposed device has a built-in means for facilitating insertion and withdrawal of a removable liquid reservoir to and from the inner container. The proposed device provides a convenient removable reservoir adapted to be filled with a suitable irrigation liquid that can be easily filled through a step or ergonomical steps.

The device has a built-in valve system that allows the removable reservoir to selectively empty into a fixed reservoir from which the growing medium may draw the appropriate amount of irrigation liquid. The level within the fixed liquid reservoir is maintained at a relatively constant level by mere static design characteristics thus eliminating complex moving parts so as to reduce the overall manufacturing cost and increase the reliability of the system.

In accordance with an embodiment of the invention, there is provided a plant containerizing and watering device for containing a plant growing medium and facilitating irrigation of the growing medium by a liquid, the device comprising in combination a first container, the first container defining a first base wall and a first peripheral wall extending from the first base wall; a second container, the second container defining a second base wall, the second base wall having at least one base wall venting aperture extending therethrough; the second container being configured and sized so as to be at least partially insertable within the first container with the first base wall and the second base walls maintained in a predetermined base wall spaced relationship relative to each other by a base wall spacing means extending therefrom, the first and second base walls defining a base reservoir volume therebetween; a trough extending outwardly from the second base wall, the trough being provided with at least one trough aperture extending therethrough, the though being configured and sized so that the at least one trough aperture is positioned within the base reservoir at a trough aperture distance from the second base wall when the first and second base walls are in the base wall spaced relationship relative to each other; a removable reservoir for containing a variable volume of the liquid, the removable reservoir being configured and sized so as to be at least partially and removably insertable within the second container; a valve means in fluid communication with the removable reservoir for, when the removable reservoir is in an operational position within the second container, selectively and automatically transfering a transfer volume of the liquid from the removable reservoir to a relatively constant volume of the liquid contained within the base reservoir volume so that the surface of the relatively constant volume of the liquid is maintained at a relatively constant base reservoir liquid level that allows fluid communication with the at least one trough aperture while being spaced from the second base wall, whereby when a fraction of the relatively constant volume of the liquid is soaked up through the at least one trough aperture by a capillary action of the growing medium contained in the second container the valve means transfers a corresponding volume of the liquid from the removable reservoir to the base reservoir volume.

Preferably, the removable reservoir includes a removable reservoir base wall and a removable reservoir peripheral wall together defining a removable reservoir hollow enclosure for containing the variable volume of the liquid; a removable reservoir pouring spout extending integrally from the removable reservoir peripheral wall substantially opposite the removable reservoir base wall, the pouring spout defining a pouring aperture and being in fluid communication with the hollow enclosure for allowing discharge of a portion of the variable volume of the liquid contained in the holow enclosure through the pouring aperture; a removable reservoir venting aperture extending through a section of the removable reservoir; the removable reservoir being configured and sized so that when the latter is in the operational position within the second container the removable reservoir hollow enclosure is in an overlying relationship relative to the pouring aperture and the pouring aperture is submerged in the relatively constant volume of the liquid; the pouring aperture being positionned intermediate the removable reservoir hollow enclosure and the pouring aperture so as to be substantially in register with the base reservoir liquid level when the removable reservoir is in the operational position within the second container, whereby when a fraction of the relatively constant volume of the liquid is soaked up through the at least one trough aperture by a capillary action of the growing medium contained in the second container, the base reservoir liquid level temporarely falls below at least a portion of the removable reservoir venting aperture allowing at least a fraction of a base volume of air contained between the relatively constant volume of the liquid and the second base wall to flow into the hollow enclosure so as to reduce the vacuum created therein by the variable volume of the liquid and allow a portion thereof to flow though the pouring aperture until the removable reservoir venting aperture is submerged in the relatively constant volume of the liquid stopping the flow through the pouring aperture.

Conveniently, the second base wall has a spout receiving aperture extending therethrough, the spout receiving aperture being configured and sized for slidably receiving at least a section of the pouring spout, the spout receiving aperture defining a spout receiving aperture peripheral edge; the pouring spout has an abutment rim extending radially therefrom, the abutment rim being configured and sized so as to abut against the spout receiving aperture peripheral edge when the removable reservoir is in the operational position.

Preferably, the pouring spout has a generally tubular configuration defining a spout proximal end extending from the removable reservoir peripheral wall and an opposed spout distal end. Also the removable reservoir venting aperture preferably includes at least one notch formed on the peripheral edge of the spout distal end.

In at least one embodiment, the removable reservoir is configured and sized so as not to protrude from the second container when in the operational position.

The device preferably further includes a reservoir sleeve extending from the second base wall, the reservoir sleeve being configured and sized for slidably receiving at least a section of the removable reservoir; whereby the reservoir sleeve is adapted to physically separate the removable reservoir from the growing medium when the latter is contained in the second container.

Conveniently, the device further includes a liquid level indicating means for indicating the level of the liquid contained in the removable reservoir. Also, the removable reservoir is conveniently made out of a transluscent material and the liquid level indicating means includes a flotable object positioned within the removable reservoir, the flotable object having a density such that it will float adjacent the surface of the liquid; whereby the transluscent material is adapted to allow an intended user to locate the flotable object within the removable reservoir to approximate the level of the liquid contained within the removable reservoir.

Preferably, the base wall spacing means includes at least one abutment leg extending outwardly from the second base wall, the at least one abutment leg being configured and sized so as to abut against the first base wall when the second container is inserted within the first container.

Conveniently, the base wall spacing means includes a peripheral shoulder extending inwardly from an inner surface of the first peripheral wall, the peripheral shoulder being configured and sized for abuttingly supporting a corresponding peripheral edge of the second base wall when the second container is inserted within the first container.

Preferably, the base wall spacing means includes the trough, the trough being configured and sized so as to abut against the first base wall when the second container is inserted within the first container.

Conveniently, the trough has a generally frustro-conical configuration defining a substantially flat trough base wall and an angled trough peripheral wall, the trough peripheral surface being provided with a plurality of trough apertures extending therethrough.

Conveniently, the second container further includes a second peripheral wall extending from the second base wall. The second peripheral wall is provided with at least one peripheral wall venting aperture extending therethrough and being configured and sized so as to be in a spaced relationship relative to the first peripheral wall when the second container is inserted within the first container.

The device further conveniently includes a peripheral wall spacing means for maintaining the first and second peripheral walls in a predetermined spaced relationship relative to each other when the second container is inserted within the first container.

Preferably, the peripheral wall spacing means includes a peripheral flange extending from an upper peripheral edge of the second peripheral wall. Preferably, the peripheral flange has a generally "L"-shaped cross-sectional configuration defining a flange spacing segment extending generally radially from the second peripheral wall and a flange abutment segment extending generally perpendicularly and downwardly from the flange spacing segment.

BRIEF DESCRIPTION OF THE DRAWINGS

An embodiment of the present invention will now be disclosed, by way of example, in reference to the following drawings in which:

FIG. 1, in a perspective view, illustrates a plant containerizing and watering device in accordance with an embodiment of the present invention FIG. 2, in a longitudinal cross sectional view, illustrates some of the components of the device shown in FIG. 1.

FIG. 3, in a transversal cross sectional view taken along arrows III—III of FIG. 2, illustrates some of the internal components of the device shown in FIGS. 1 and 2.

FIG. 4, in a longitudinal cross sectional view, illustrates the device shown in FIGS. 1 through 3 with a plant growing in a growing medium contained therein and a liquid for irrigating the growing medium also contained therein.

FIG. 5, in a partial perspective view with sections taken out, illustrates the configuration of some of the internal components of the device shown in FIGS. 1 through 4.

DETAILED DESCRIPTION

Referring to FIG. 4, there is shown a plant containerizing and watering device 10 in accordance with an embodiment of the present invention. The device 10 is adapted to contain a plant growing medium 12 for growing a plant 14. The device 10 is also adapted to facilitate irrigation of the growing medium 12 by a liquid 16.

The device 10 includes a first container 18 defining a first base wall 20 and a first peripheral wall 22 extending from the first base wall 20. The device 10 also includes a second container 24 defining a second base wall 26. As shown more specifically in FIGS. 3 and 5, the second base wall 26 has at least one base wall venting aperture 29 extending therethrough. The venting apertures 29 preferably take the form of arc segments positioned concentrically relative to each other.

The second container 24 is configured and sized so as to be at least partially insertable within the first container 18 with the first base wall 20 and the second base wall 26 maintained in a predetermined base wall spaced relationship relative to each other by a base wall spacing means extending therefrom. The first and second base walls 20, 26 define a base reservoir volume 28 therebetween.

The device 10 further includes a trough 30 extending outwardly from the second base wall 26. The trough 30 is provided with at least one trough aperture 32 extending therethrough. The trough 30 is configured and sized so that at least one trough aperture 32 is positioned within the base reservoir 28 at a trough aperture distance from the second base wall 20 when the first and second base walls 20, 26 are in their base wall spaced relationship relative to each other defining the base reservoir volume 28 therebetween.

The device 10 still further includes a removable reservoir 34 for containing a variable volume of liquid 16. The removable reservoir 34 is configured and sized so as to be at least partially and removably insertable within the second container 24. A valve means is provided in fluid communication with the removable reservoir 34 for selectively and automatically transferring a transfer volume of the liquid 16 from the removable reservoir 34 to a relatively constant volume of the liquid 16 contained in the base reservoir volume 28 when the removable reservoir 34 is in an operational position shown in FIGS. 1 through 4. The transfer of the transfer volume of the liquid 16 from the removable reservoir 34 to the relatively constant volume of the liquid 16 contained in the base reservoir 28 allows the surface of the relatively constant volume of the liquid 16 to be maintained at a relatively constant base reservoir liquid level that allows fluid communication with at least one trough aperture 32 while being spaced from the second base wall 26.

In use, when a fraction of the relatively constant volume of the liquid 16 contained in the base reservoir volume 28 is soaked up through the at least one trough aperture 32 by a capillary action of the growing medium 12 contained in the second container 24. The valve means transfers a corresponding volume of the liquid 16 from the removable reservoir 34 to the base reservoir volume 28.

The removable reservoir 34 preferably includes a removable reservoir base wall 36 and a removable reservoir peripheral wall 38 together defining a removable reservoir hollow enclosure 40 for containing the variable volume of liquid 16. The removable reservoir 34 also preferably includes a removable reservoir pouring spout 42 extending integrally from the removable reservoir peripheral wall 38 substantially opposite the removable reservoir base wall 36. The pouring spout 42 defines a pouring aperture 44. The pouring spout 42 is in fluid communication with the hollow enclosure 40 for allowing discharge of a portion of the variable volume of liquid 16 contained in the hollow enclosure 40 through the pouring aperture 44.

A removable reservoir venting aperture 46 extends through a section of the removable reservoir 40 and preferably through the removable reservoir pouring spout 42. The removable reservoir 34 is configured and sized so that when the latter is in the operational position shown in FIGS. 1, 2 and 4 within the second container 24 the removable reservoir hollow enclosure 40 is in an overlying relationship relative to the pouring aperture 44 and the pouring aperture 44 is submerged in the relatively constant volume of liquid 16 contained within the base reservoir volume 28.

When a fraction of the relatively constant volume of liquid 16 is soaked up through the at least one trough aperture 32 by capillary action of the growing medium 12 contained in the second container 24, the base reservoir liquid level temporarily falls below at least a portion of the removable reservoir venting aperture 46 thus allowing at least a fraction of the volume of air contained between the relatively constant volume of liquid 16 and the second base wall 26 to flow into the hollow enclosure 40. In turn, the inflow of air within the hollow enclosure 40 reduces the vacuum created within the hollow enclosure 40 by the liquid 16 contained therein.

As is well known in the art, reduction of the vacuum effect allows a portion of the liquid 16 contained within the hollow enclosure 40 to flow through the pouring aperture 46. The liquid 16 flows out through the pouring aperture 46 until the latter is submerged in the relatively constant volume of liquid contained in the base reservoir volume 28 reestablishing the equilibrium between hydrostatic and capillary forces which stops the outflow through the pouring aperture 44 until the base reservoir liquid level is again lowered by capillary action of the growing medium 12. The humidity level of the growing medium 12 which, at least partially, controls the capillary action of the latter thus, through the use of the valve means created by the specific configuration of the invention, allows for an automatically self regulated watering system which tends to maintain the humidity level of the growing medium 12 at a relatively constant value.

The combination of the pouring aperture 44, the venting aperture 46 and their positioning relative to the base reservoir volume 28 thus defines a valve means for selectively blocking the transfer of said liquid from the removable reservoir to the base reservoir volume.

Preferably, the second base wall 26 has a spout receiving aperture 48 extending therethrough. The spout receiving aperture 48 is configured and sized for slidably receiving at least a section of the pouring spout 42. The spout receiving aperture 48 defines a spout receiving aperture peripheral edge. In one embodiment of the invention shown in FIG. 4, the pouring spout 42 has an abutment rim 50 extending radially therefrom. The abutment rim 50 is configured and sized so as to abut against the spout receiving aperture peripheral edge when the removable reservoir 34 is in the operational position shown in FIG. 4. Preferably, the pouring spout 42 has a generally tubular configuration defining a spout proximal end extending from the removable reservoir peripheral wall 38 and an opposed spout distal end. The venting aperture 46 preferably includes at least one notch formed on the peripheral edge of the spout distal end.

In one embodiment of the invention shown more specifically in FIG. 2, the removable reservoir 34 is configured and sized so as not to protrude from the second container 24 when in the operational position. This allows the removable reservoir to be virtually invisible to individual looking at the device 10 from elevational views so as not to deter to the overall aesthetical appearance of the device 10.

The device 10 preferably further includes a reservoir sleeve 50 extending from the second base wall 26. The reservoir sleeve 50 preferably includes a sleeve wall 52 having a generally "U" shaped cross sectional configuration and attached at both ends of the "U" legs to the second container 24. The reservoir sleeve 50 is adapted to physically separate the removable reservoir 34 from the growing medium 12 when the latter is contained in the second container 24. The physical separation of the removable reservoir 34 from the growing medium 12 prevents soiling of the exterior surface of the removable reservoir 34 and facilitates its positioning in the operational position.

The device 10 optionally also includes a liquid level indicating means for indicating the level of liquid 16 contained in the removable reservoir 34. Typically although by no means exclusively, the removable reservoir 16 is made out of a transparent or translucent material and the liquid level indicating means includes a floatable object 54 positioned within the removable reservoir 34. The floatable object 54 has a density such that it will float adjacent the surface of the liquid 16.

The level indicating means also typically includes a level indicia typically taking the form of a level line 56 marked on the exterior surface of the removable reservoir 34 at a predetermined location. The transparent or translucent material is adapted to allow an intended user to locate the floatable object 54 within the removable reservoir 34 and compare its location to that of the indicia 56 so as approximate the level of liquid 16 contained within the removable reservoir 34.

The base wall spacing means typically includes at least one abutment leg 58 extending outwardly from the second base wall 26. The at least one abutment leg 58 is configured and sized so as to abut against an inner surface of the first base wall 20 when the second container 24 is inserted within the first container 18 as shown in FIG. 4. Typically, although by no means exclusively, the device 10 includes three generally planer abutment legs 58 that extend radially relative to the trough 30.

The base wall spacing means optionally also includes a peripheral shoulder 60 extending inwardly from an inner surface of the first peripheral wall 22. The peripheral shoulder 60 is configured and sized so as to abuttingly support a corresponding peripheral edge of the second base wall 26 when the second container 24 is inserted within the first container 18.

Optionally, the base wall spacing means also includes the trough 30 that is configured and sized so as to abut against the first base wall 20 and the second container 24 is inserted within the first container 18. Preferably, although by no means exclusively, the trough 30 has a generally frustro-conical configuration defining a substantially flat trough base wall 62 and an angled trough peripheral wall 64. The trough peripheral wall 64 is preferably provided with a plurality of trough apertures 32 extending therethrough. Preferably, the trough apertures 32 each have a generally oval or slot like configuration.

Preferably, the second container 24 preferably further includes a second peripheral wall 66 extending from the second base wall 26. The second peripheral wall 66 is provided with at least one and preferably a plurality of peripheral wall venting apertures 68 extending therethrough.

The second peripheral wall 66 is preferably configured and sized so as to be in a spaced relationship relative to the first peripheral wall 22 when the second container 24 is inserted within the first container 18. The device 10 preferably further includes a peripheral wall spacing means for maintaining the first and second peripheral walls 22, 66 in a predetermined spaced relationship relative to each other when the second container 24 is inserted within the first container 18.

The peripheral wall spacing means typically takes the form of a peripheral flange 70 extending from an upper peripheral edge of the second peripheral wall 66. The peripheral flange 70 typically although by no means exclusively has a generally "L" shaped cross sectional configuration defining a flange spacing segment 72 extending generally radially from the peripheral wall 66 and a flange abutment segment 74 extending generally perpendicularly and downwardly from the flange spacing segment 72. The peripheral flange 70 is adapted to abut against an inner surface of the first peripheral wall 22 so as to maintain a first and second peripheral walls 22, 66 in the predetermined relationship relative to each other.

The second container 24 preferably further includes a grasping means for facilitating the prehension thereof. The grasping means typically takes the form of a pair of grasping handles 76 each having inverted "L" shaped configuration and extending from diametrically opposed upper peripheral edge sections of the second peripheral wall 66. The grasping handles 76 are configured and sized so as to protrude from the first container 18 when the second container 24 is inserted therein. Optionally, the first container 18 is provided with a drainagre aperture 82 extending therethrough, preferably adjacent the first base wall 26.

The handles 76 are adapted to protrude from the upper peripheral edge of the first peripheral wall 22 so as to facilitate insertion and withdrawal of the second container 24 to and from the first container 18. Each handle 76 preferably defines a handle spacing segment 78 extending in a generally parallel relationship with the second peripheral wall 66 and a handle grasping segment 80 extending generally perpendicularly from a distal end of the handle spacing segment 78.

The embodiments of the invention in which an exclusive priviledge or property is claimed are defined as follows:

1. A plant containerizing and watering device for containing a plant growing medium and facilitating irrigation of said growing medium by a liquid, said device comprising in combination:

a first container, said first container defining a first base wall and a first peripheral wall extending from said first base wall;

a second container, said second container defining a second base wall and a second peripheral wall extending from said second base wall, said second base wall having at least one base wall venting aperture extending therethrough, said second peripheral wall being provided with at least one peripheral wall venting aperture extending therethrough;

said second container being configured and sized so as to be at least partially insertable within said first container with said first base wall and said second base wall maintained in a predetermined base wall spaced relationship relative to each other by a base wall spacing means extending therefrom, said first and second base walls defining a base reservoir volume therebetween; said second peripheral wall being configured and sized so as to be in a spaced relationship relative to said first peripheral wall when said second container is at least partially inserted within said first container all around the periphery of said second peripheral wall so as to allow air flow between said first peripheral wall and said second peripheral wall;

a trough extending outwardly from said second base wall, said trough being provided with at least one trough aperture extending therethrough, said though being configured and sized so that said at least one trough aperture is positioned within said base reservoir at a trough aperture distance from said second base wall when said first and second base walls are in said base wall spaced relationship relative to each other;

a removable reservoir for containing a variable volume of said liquid, said removable reservoir being configured and sized so as to be at least partially and removably insertable within said second container;

a valve means for selectively blocking the transfer of said liquid from said removable reservoir to said base reservoir volume, said valve means being in fluid communication with said removable reservoir, said valve means being configured such that when said removable reservoir is in an operational position within said second container said valve means selectively and automatically allows a transfer volume of said liquid to flow from said removable reservoir to a relatively constant volume of said liquid contained within said base reservoir volume so that the surface of said relatively constant volume of said liquid is maintained at a relatively constant base reservoir liquid level, said base reservoir liquid volume allowing fluid communication with said at least one trough aperture while being spaced from said second base wall so as to allow simultaneous venting through said at least one base wall venting aperture and said at least one peripheral wall venting aperture, whereby when a fraction of said relatively constant volume of said liquid is soaked up through said at least one trough aperture by a capillary action of said growing medium contained in said second container said valve means transfers a corresponding volume of said liquid from said removable reservoir to said base reservoir volume.

2. A plant containerizing and watering device as recited in claim 1 wherein said removable reservoir includes a removable reservoir base wall and a removable reservoir peripheral wall together defining a removable reservoir hollow enclosure for containing said variable volume of said liquid;

a removable reservoir pouring spout extending integrally from said removable reservoir peripheral wall substantially opposite said removable reservoir base wall, said pouring spout defining a pouring aperture and being in fluid communication with said hollow enclosure for allowing discharge of a portion of said variable volume of said liquid contained in said hollow enclosure through said pouring aperture;

a removable reservoir venting aperture extending through a section of said removable reservoir;

said removable reservoir being configured and sized so that when the latter is in said operational position within said second container said removable reservoir hollow enclosure is in an overlying relationship relative to said pouring aperture and said pouring aperture is submerged in said relatively constant volume of said liquid;

said pouring aperture being positioned intermediate said removable reservoir hollow enclosure and said pouring aperture so as to be substantially in register with said base reservoir liquid level when said removable reservoir is in said operational position within said second container;

said valve means including said pouring aperture, said venting aperture and their positioning relative to said base reservoir volume;

whereby when a fraction of said relatively constant volume of said liquid is soaked up through said at least one trough aperture by a capillary action of said growing medium contained in said second container, said base reservoir liquid level temporarily falls below at least a portion of said removable reservoir venting aperture allowing at least a fraction of a base volume of air contained between said relatively constant volume of said liquid and said second base wall to flow into said hollow enclosure so as to reduce the vacuum created therein by said variable volume of said liquid and allow a portion thereof to flow though said pouring aperture until said removable reservoir venting aperture is submerged in said relatively constant volume of said liquid stopping the flow through said pouring aperture.

3. A plant containerizing and watering device as recited in claim 2 wherein said second base wall has a spout receiving aperture extending therethrough, said spout receiving aperture being configured and sized for slidably receiving at least a section of said pouring spout, said spout receiving aperture defining a spout receiving aperture peripheral edge;

said pouring spout has an abutment rim extending radially therefrom, said abutment rim being configured and sized so as to abut against said spout receiving aperture peripheral edge when said removable reservoir is in said operational position.

4. A plant containerizing and watering device as recited in claim 3 wherein said pouring spout has a generally tubular configuration defining a spout proximal end extending from said removable reservoir peripheral wall and an opposed spout distal end.

5. A plant containerizing and watering device as recited in claim 4 wherein said removable reservoir venting aperture includes at least one notch formed on the peripheral edge of said spout distal end.

6. A plant containerizing and watering device as recited in claim 2 wherein said removable reservoir is configured and sized so as not to protrude from said second container when in said operational position.

7. A plant containerizing and watering device as recited in claim 1 further including a reservoir sleeve extending from said second base wall, said reservoir sleeve being configured and sized for slidably receiving at least a section of said removable reservoir;

whereby said reservoir sleeve is adapted to physically separate said removable reservoir from said growing medium when the latter is contained in said second container.

8. A plant containerizing and watering device as recited in claim 1 further including a liquid level indicating means for indicating the level of said liquid contained in said removable reservoir.

9. A plant containerizing and watering device as recited in claim 8 wherein said removable reservoir is made out of a transluscent material and said liquid level indicating means includes a flotable object positioned within said removable reservoir, said flotable object having a density such that it will float adjacent the surface of said liquid;

whereby said transluscent material is adapted to allow an intended user to locate said flotable object within said removable reservoir to approximate the level of said liquid contained within said removable reservoir.

10. A plant containerizing and watering device as recited in claim 1 wherein said base wall spacing means includes at least one abutment leg extending outwardly from said second base wall, said at least one abutment leg being configured and sized so as to abut against said first base wall when said second container is inserted within said first container.

11. A plant containerizing and watering device as recited in claim 1 wherein said base wall spacing means includes a peripheral shoulder extending inwardly from an inner surface of said first peripheral wall, said peripheral shoulder being configured and sized for abuttingly supporting a corresponding peripheral edge of said second base wall when said second container is inserted within said first container.

12. A plant containerizing and watering device as recited in claim 1 wherein said base wall spacing means includes said trough, said trough being configured and sized so as to abut against said first base wall when said second container is inserted within said first container.

13. A plant containerizing and watering device as recited in claim 12 wherein said trough has a generally frustro-conical configuration defining a substantially flat trough base wall and an angled trough peripheral wall, said trough peripheral surface being provided with a plurality of trough apertures extending therethrough.

14. A plant containerizing and watering device as recited in claim 1 further comprising a peripheral wall spacing means for maintaining said first and second peripheral walls in a predetermined spaced relationship relative to each other when said second container is inserted within said first container.

15. A plant containerizing and watering device as recited in claim 14 wherein said peripheral wall spacing means includes a peripheral flange extending from an upper peripheral edge of said second peripheral wall.

16. A plant containerizing and watering device as recited in claim 15 wherein said peripheral flange has a generally "L"-shaped cross-sectional configuration defining a flange spacing segment extending generally radially from said second peripheral wall and a flange abutment segment extending generally perpendicularly and downwardly from said flange spacing segment.

17. A plant containerizing and watering device as recited in claim 1 further including a grasping means for facilitating the grasping of said second container, said grasping means extending from said second peripheral wall and protruding from said first container when said second container is inserted whithin said first container.

18. A plant containerizing and watering device as recited in claim 1 wherein said second peripheral wall is provided with a plurality of peripheral wall venting apertures extending therethrough, said peripheral wall venting apertures being disposed all around the periphery of said second peripheral wall.

* * * * *